Patented Nov. 21, 1922.

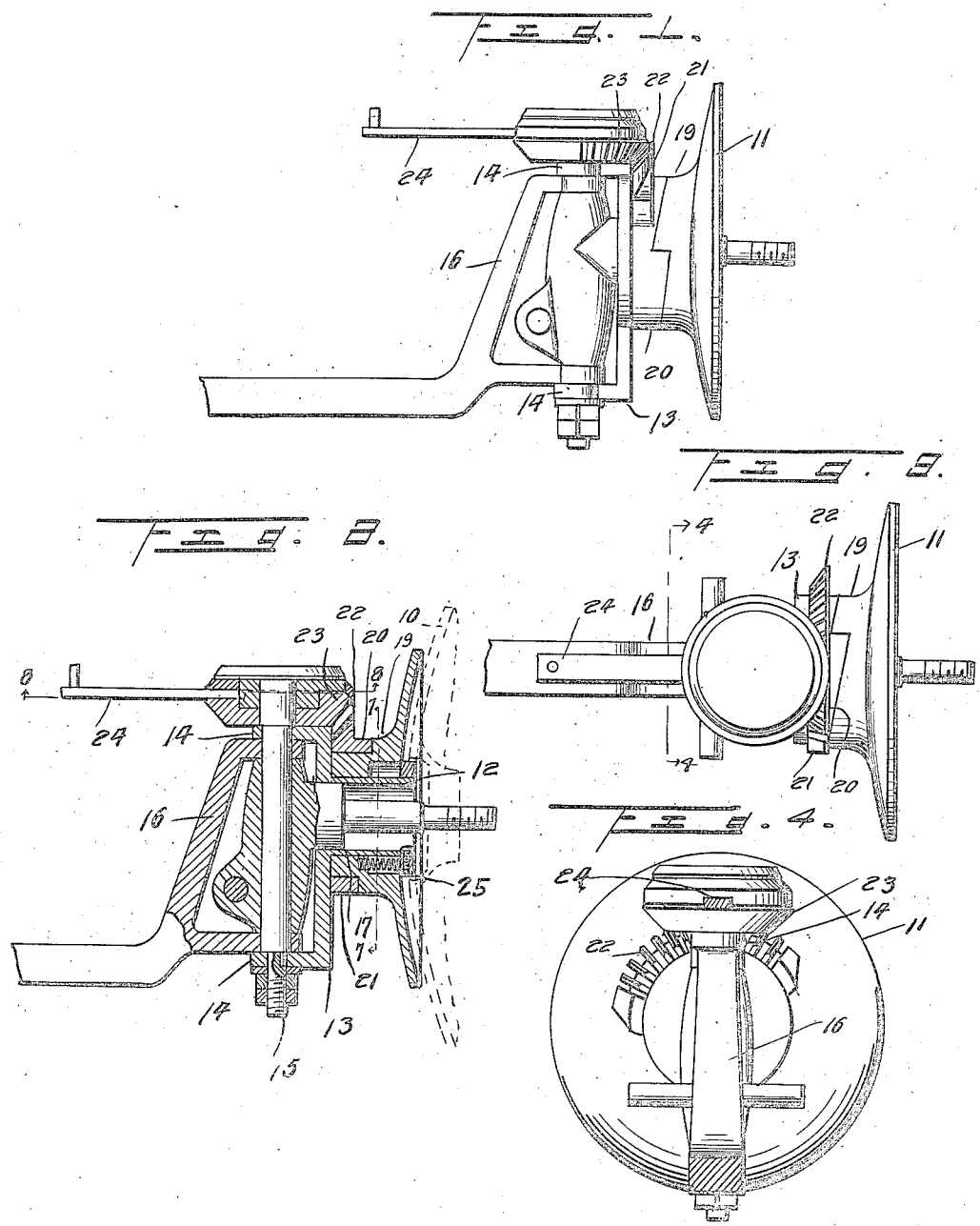

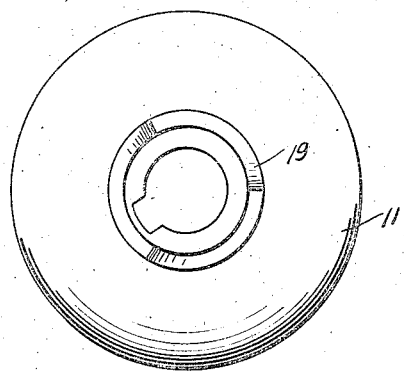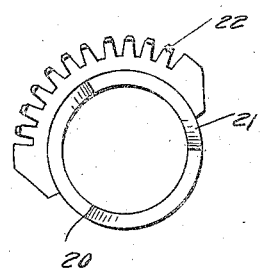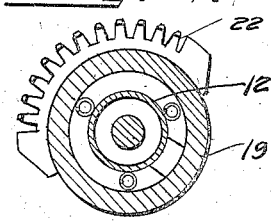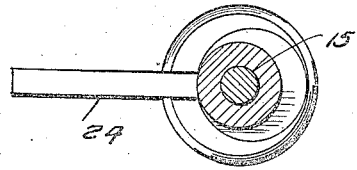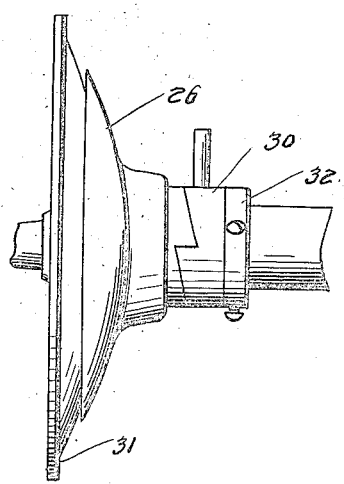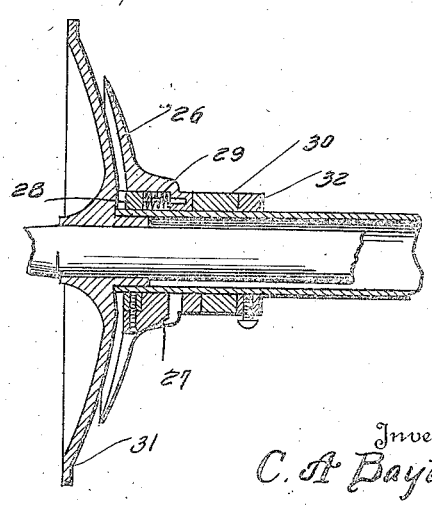

1,436,563

UNITED STATES PATENT OFFICE.

CHARLES A. BAYLOR, OF LAPORTE, INDIANA, ASSIGNOR OF ONE-HALF TO JOHN E. McGRAW, OF LAPORTE, INDIANA.

VEHICLE BRAKE.

Application filed July 26, 1921. Serial No. 487,607.

*To all whom it may concern:*

Be it known that I, CHARLES A. BAYLOR, a citizen of the United States, residing at Laporte, in the county of Laporte and State of Indiana, have invented certain new and useful Improvements in a Vehicle Brake; and I do hereby declare the following to be a full, clear, and exact description of the invention, such as will enable others skilled in the art to which it appertains to make and use the same.

The object of the invention is to provide a direct and positive wheel brake for vehicles of the automobile and similar type which may be applied to any or all of the wheels either steering or driving and adapted to operate upon the hub of the wheel particularly of the type known commercially as the disk steel wheel having a central convexed or spherically rounded hub disk, said brake being adapted to restrain the wheel in rotation in either direction and acting in a direction parallel with the axis of rotation of the wheel; and with this object in view the invention consists in a construction, combination and relation of parts of which a preferred embodiment is shown in the accompanying drawings, wherein:

Figure 1 is an elevation of a front or steering wheel bearing fitted with a brake mechanism embodying the invention.

Figure 2 is a vertical sectional view of the same, taken in the plane of the axis of the wheel.

Figure 3 is a plan view of the same.

Figure 4 is an inner elevation showing the axle in section on the plane indicated by the line 4—4 of Figure 3.

Figures 5 and 6 are detail views respectively of the brake disk and cam ring disposed to show the complemental cam faces thereof.

Figure 7 is a section on the line 7—7 of Figure 2.

Figure 8 is a section on the line 8—8 of Figure 2.

Figure 9 is an elevation of the brake mechanism applied to a driving or rear wheel, and Figure 10 is a sectional view on the same taken parallel with the axis of the wheel.

The brake mechanism, which is designated particularly for operation in connection with a convexed or spherically rounded hub disk 10 of the type ordinarily used in connection with disk steel wheels as they are commercially known, consists essentially of a brake disk 11, conforming at its outer or contacting face with the surface of the hub disk for an even and uniform contact therewith and mounted for movement axially of the wheel upon a tubular guide 12 which in the construction shown in Figures 1 to 5 is carried by and forms a part of a hanger 13 mounted by means of the arms 14 on the knuckle bolt or pin 15 independently of the hanger 16 which is common to front wheel structures, said tubular guide being arranged in telescoping relation with the spindle member 17 of said wheel hanger. Thus while the means for mounting the brake head and which for convenience may be termed the "brake hanger" is independent of the "wheel hanger" as ordinarily employed and is separately mounted upon the knuckle bolt or pin, it is so related by means of the tubular guide with the spindle member of the wheel hanger as to maintain an accurate axial relation with the wheel mounted upon the wheel hanger regardless of the steering movement of the wheel hanger, so that the brake disk is always in operative relation with the hub disk and is adapted by axial movement with relation to the hub disk to be brought into such frictional engagement therewith as to act as a check to the rotary movement of the latter.

In the construction illustrated (see Figures 1 to 6 inclusive as applied to front or steering wheels) the means for actuating the brake disk and for bringing it into engaging relation with the hub disk consists of a thrust cam constructed substantially like an ordinary form of ratchet clutch with complementary cam faces 19 and 20 carried respectively by the brake disk and by a rotatively mounted operating ring 21 having, for example, a rack 22 of segmental form for engagement by a pinion 23 which is actuable by an operating lever 24 mounted upon the brake hanger. By a swinging movement of the operating or brake lever the pinion may be turned to a greater or less extent to communicate rocking or rotary movement to the cam ring and thus impart thrust outwardly to the brake disk to bring it into any desired degree of forcible engagement with the hub disk to effect a checking effect upon the movement of the wheel, the brake disk being yieldingly retracted by springs 25 disposed to oppose the action of the thrust cam.

In the particular form of the device adapted for use in connection with rear or driving wheels the brake disk 26 is held from rotation upon the axle shaft by means of a key 27 extending from a ring 28 which supports the retracting spring 29, and the operating ring 30 and the adjacent portion of the brake disk carrying complemental cam faces similar to those above described whereby a rotary movement of the operating ring will cause a thrust of the brake disk in a path parallel with the axis of the wheel to force its outer surface into engagement with the surface of the hub disk 31. A backing or thrust ring 32 is secured in the path of inward movement of the operating ring to afford the necessary support for the same. While no particular means have been illustrated in the drawings for communicating motion to the operating ring it will be understood that any suitable mechanical device serving to enable the driver of the car to communicate motion thereto from his station at the driver's seat may be employed in this connection.

In both embodiments of the device the brake disk is supposed to occupy a position very close to the surface of the hub disk so as to prevent the access of foreign materials and require but a very slight movement of the operating means to effect a frictional engagement which will serve as a brake to the rotation of the wheels.

While the preferred embodiment of this invention is shown and described it will be understood that minor changes in the details of construction and arrangement of parts may be resorted to within the scope of what is claimed without departing from the spirit of the invention.

Having thus described the invention, what I claim is:—

1. A vehicle wheel brake having in combination with a hub disk, a brake disk conforming to the side surface of said hub disk and means for moving the brake disk in a path parallel with the axis of the wheel, and consisting of cooperating cam faces, one of which is carried by a revoluble cam ring.

2. In combination with a wheel spindle, an axle extending therefrom and the pivot means for the spindle, a hanger mounted by pivot means, a guide member extending from the hanger and about the axle, a brake member to engage a wheel slidable on said guide element, a cam member journaled on said brake member operable to impart movement to the latter, and gearing mounted by said pivot means cooperating with the cam member.

3. In combination with a wheel mounting, a hanger secured by the fastening means of said mounting, a brake member for engagement with a wheel, and means to operatively mount said brake member on said hanger.

In testimony whereof I affix my signature in presence of two witnesses.

CHARLES A. BAYLOR.

Witnesses:
 CHARLES M. ELLIOTT,
 FRANK E. BEHRNDT.